Sept. 30, 1958 G. H. FISHER 2,853,828
COMBINED MINNOW BUCKETS AND FISH LURES
Filed Sept. 22, 1954
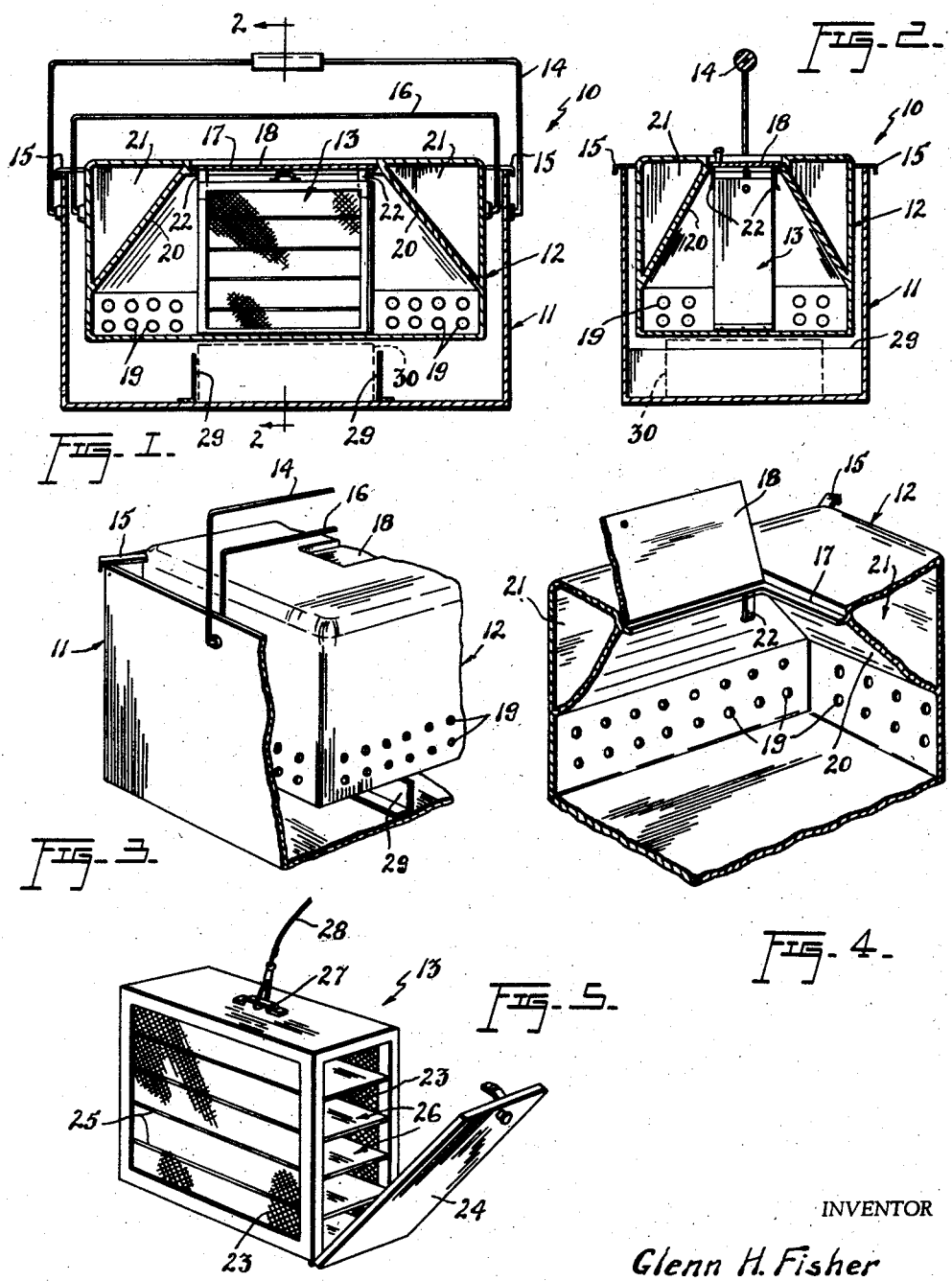
INVENTOR
Glenn H. Fisher

United States Patent Office 2,853,828
Patented Sept. 30, 1958

2,853,828
COMBINED MINNOW BUCKETS AND FISH LURES

Glenn H. Fisher, Kansas City, Mo.

Application September 22, 1954, Serial No. 457,630

1 Claim. (Cl. 43—56)

This invention relates to new and useful improvements and structural refinements in minnow buckets, and the principal object of the invention is to combine the functions of a conventional bucket and a bait holder, the latter being of such nature that, when removed from the bucket, it may be employed as a lure while fishing.

Briefly stated, the invention contemplates the provision of a minnow bucket consisting of an outer pail for holding water, an inner pail which is removably positioned in the outer pail and is provided with water passages communicating with the outer pail, and a bait holder which is removably positioned either in the inner pail or in a space between the two pails and which, by itself, may be used as a fishing lure.

An important feature of the invention resides in the construction of the bait holder per se, while another important feature resides in the arrangement of the inner pail so that, when removed from the outer pail, it may be placed to float in water.

Some of the advantages of the invention reside in its simplicity of construction, convenient operation, and in its adaptability to economical manufacture.

With the above more important objects and features in view and such other objects and features as may become apparent as this specification proceeds, the invention resides in the details of construction and arrangement of parts substantially as shown in the accompanying drawing, wherein like characters of reference are used to designate like parts and wherein:

Figure 1 is a vertical sectional view of the invention;

Figure 2 is a cross sectional view, taken substantially in the plane of the line 2—2 in Figure 1;

Figure 3 is a fragmentary perspective view of the invention;

Figure 4 is a fragmentary perspective view of the inner pail; and

Figure 5 is a perspective view of the bait holder per se.

With reference now to the accompanying drawing in detail, the minnow bucket is designated generally by the reference numeral 10 and embodies in its construction an outer pail 11, an inner pail 12 and a bait holder 13.

The outer pail 11 is equipped with a suitable carrying handle 14, while the inner pail 12 is provided at each of its upper corners with angulated brackets 15 which rest on the upper edge of the outer pail 11 and support the inner pail in position therein. It is to be noted that the angulated extremities of the brackets 15 prevent the inner pail from sliding or shifting laterally in the outer pail and that a space exists between the side walls of the two pails, as shown. Moreover, a substantial space exists between the bottoms of the two pails, the purpose of which will be hereinafter described.

The inner pail 12 is also provided with a carrying handle 16 and the top wall of the inner pail is formed with a framed opening 17 for a hinged door 18, whereby access to the interior of the inner pail may be had. The lower portion of the inner pail is provided with a plurality of water passages communicating with the interior of the outer pail, so that when water is placed in the outer pail it will rise to the same level in the inner pail. The inner pail, of course, is intended to contain a supply of bait such as minnows, or the like. The aforementioned water passages are shown at 19.

If desired, the inner pail 12 may be removed from the outer pail and used by itself in water. Means are provided to enable the inner pail to sustain flotation, these means involving the provision of a perimetrically extending partition wall 20 which defines a hermetically sealed air chamber 21 in the upper portion of the inner pail. As will be noted, the partition 21 is clear of the entrance opening 17.

The bait holder 13 is removably receivable in the inner pail 12 through the opening 17, and a plurality of resilient clips 22 are provided on the frame of the opening 17 to frictionally engage the bait holder and support it in place. The bait holder itself is in the form of a rectangular receptacle having foraminous side walls 23, a hinged side or door 24 and a plurality of partitions 25 which separate the interior of the bait holder into a plurality of bait receiving compartments 26. The partitions 25 are so placed that access may be simultaneously had to all the compartments 26 when the door 24 is opened. The top of the bait holder is equipped with a suitable eye or clip 27 for separable connection to a fishing line 28.

When the bait holder is removed from the bucket, it may be used as a fish lure by placing minnows or other bait in the compartments 26 and attaching the holder to a fishing line.

As already explained, the bait holder 13 may be stored in the inner pail 12. However, when the inner pail contains a supply of minnows, it may not be desired to interfere therewith by placing the bait holder there. Under such circumstances the bait holder may be stored in a flat lying position in the space between the bottoms of the inner and outer pails, and suitable guides or rails 29 may be secured to the bottom of the outer pail 11 to prevent the bait holder from sliding or shifting. The bait holder stored in this position is illustrated by the dotted lines 30.

Although in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claim.

What is claimed as new is:

In a minnow bucket, the combination of an outer pail for holding water, an inner pail removably positioned in said outer pail in spaced relation from the sides and bottom of the latter, rigid brackets provided adjacent the top of the inner pail and projecting laterally outwardly therefrom into a seating engagement with the upper edge of the outer pail whereby to support the inner pail in the outer pail, downturned extremities provided at the outer ends of said brackets at the outside of said outer pail whereby to prevent the inner and outer pails from relative lateral shifting, the lower portion of the inner pail being provided with water passages communicating with the outer pail, said inner pail having a top wall provided with a framed opening, a door for said opening provided on said top wall, a set of resilient clips secured in the frame of said opening and projecting downwardly into the inner pail, a pair of spaced upstanding guides provided on the bottom of the outer pail, and a foraminous bait holder receivable selectively in the space between the bottoms of the inner and outer pails and said guides and between said clips in the inner pail wherein said holder rests on the bottom of the inner pail and is removable through said door.

References Cited in the file of this patent

UNITED STATES PATENTS

| | | |
|---|---|---|
| 435,211 | Darrah | Aug. 26, 1890 |
| 966,661 | Daniels | Aug. 9, 1910 |
| 1,561,653 | Linguist | Nov. 17, 1925 |
| 1,620,617 | Marsh | Mar. 8, 1927 |
| 1,745,012 | Gilmore | Jan. 28, 1930 |
| 1,820,406 | Thompson | Aug. 25, 1931 |
| 2,544,049 | Sawner | Mar. 6, 1951 |
| 2,614,357 | Stoddard | Oct. 21, 1952 |
| 2,651,137 | Sweet | Sept. 8, 1953 |
| 2,706,870 | Stogner | Apr. 26, 1955 |

FOREIGN PATENTS

| | | |
|---|---|---|
| 13,578 | Great Britain | of 1897 |